United States Patent [19]

Archer et al.

[11] Patent Number: 4,677,829
[45] Date of Patent: Jul. 7, 1987

[54] METHOD FOR INCREASING THE EFFICIENCY OF GAS TURBINE GENERATOR SYSTEMS USING LOW BTU GASEOUS FUELS

[75] Inventors: David H. Archer, Ross Township, Allegheny County; M. Mushtaq Ahmed, Turtle Creek, both of Pa.

[73] Assignee: Westinghouse Electric Corp., Pittsburgh, Pa.

[21] Appl. No.: 827,036

[22] Filed: Feb. 7, 1986

[51] Int. Cl.$^4$ .............................................. F02C 3/28
[52] U.S. Cl. ................................ 60/39.02; 60/39.12
[58] Field of Search ............... 60/39.02, 39.12, 39.182, 60/39.465, 39.52

[56] References Cited

U.S. PATENT DOCUMENTS

| | | | |
|---|---|---|---|
| 3,150,487 | 9/1964 | Mangan et al. | 60/39.511 |
| 3,422,800 | 1/1969 | LaHaye | 60/39.182 |
| 3,703,807 | 11/1972 | Rice | 60/39.182 |
| 4,085,578 | 4/1978 | Kydd | 60/39.12 |
| 4,204,401 | 5/1980 | Earnest | 60/39.52 |
| 4,426,842 | 1/1984 | Collet | 60/39.511 |
| 4,618,310 | 10/1986 | Michelson | 415/1 |

FOREIGN PATENT DOCUMENTS 3002615 6/1981 Fed. Rep. of Germany ... 60/39.182

Primary Examiner—Louis J. Casaregola
Attorney, Agent, or Firm—Daniel C. Abeles

[57] ABSTRACT

An improvement in a process for operating a gas turbine system containing a compression unit, a combustion unit and an expansion unit to operate a generator, wherein a low BTU gaseous fuel is used in the combustion unit and a portion of the air from the compression unit is bled from the system so as to prevent surges in the compression unit by limiting the flow of combustion gases to the compression unit, which comprises heating the air charged to the compression unit so as to reduce the volume of air from the compression unit that is bled from the system, and thereby increase the efficiency of the gas turbine system.

14 Claims, 2 Drawing Figures

METHOD FOR INCREASING THE EFFICIENCY OF GAS TURBINE GENERATOR SYSTEMS USING LOW BTU GASEOUS FUELS

FIELD OF THE INVENTION

The present invention relates to a method of increasing the efficiency of gas turbine generator systems using low BTU fuels by increasing the absolute temperature of the inlet air to the system so as to reduce or eliminate the need to bleed air from the system such as is required in conventional systems. Fuel and air flow are reduced but power output is maintained.

BACKGROUND OF THE INVENTION

The use of gas turbines for the generation of electrical energy with optional cogeneration of steam is commercially desirable. Such gas turbines normally involve at least one compression unit, at least one combustion unit and at least one expansion unit or turbine. Efficiencies of various systems vary dependent upon, among other factors, the heat value of the gas combusted.

There is an increasing interest in the use of gases of lower than conventional heat values, or low BTU gases, in gas turbine generator systems. Such low BTU gas, for example, can be produced by air blown gasification of low-grade fuels, such as peat, and/or combustible wastes, which contain significant quantities of oxygen and water moisture and which may be cooled by the evaporation of water spray from the gasification temperature to a temperature suitable for use in the combustion unit of a gas turbine system.

When such low heat value gases are used in a gas turbine system, it is usually necessary to bleed a portion of the air passing through the compression unit of the system. The large mass of moist, low BTU gas fuel required in the combustion unit of the system to reach the design expander unit inlet temperature results in an increased mass flow through the expansion unit and an increased expansion unit inlet pressure. Air bleed from the compression unit outlet may then be required to prevent a surge in the compression unit by limiting the expansion unit flow and thus the pressure at the outlet of the compression unit and inlet of the expansion unit. Air bleed of up to about 20 percent may be required, depending upon the BTU per cubic feet content and temperature of the fuel gas, to prevent surge. This air bleed represents an energy loss, in that the air may have been compressed from atmospheric pressure to 8-20 atmospheres by the compression unit. Typically, the energy loss is up to 30 percent of that produced by the gas turbine engine. Alternatively, the air can be expanded in an auxiliary device to regain the energy of the compression unit, but such auxiliary expansion requires additional equipment and expense.

Mangan et al., in U.S. Pat. No. 3,150,487 disclose a process for operating a gas turbine system containing a compression unit, a combustion unit and an expansion unit wherein the discharge gases are used to generate steam to operate a steam turbine and, directly or indirectly, to heat the air supplied to the compression unit. Mangan et al. allege improvements in efficiency of an integrated power plant employing a gas turbine with a steam turbine driven by steam generated by exhaust gas from the gas tubine.

La Haye in U.S. Pat. No. 3,422,800, relate to an improved control system for a gas turbine and a waste heat boiler system similar to that of Mangan et al. which independently controls steam generating capabilities of the boiler despite variations in gas turbine load.

Rice's invention in U.S. Pat. No. 3,703,807 is an improvement in the process of Mangan et al. in that part of the boiler stack gas is mixed with ambient air entering the gas section prior to filtration, resulting in a reduction of the loss of heat through the stack, thereby increasing the efficiency of the power plant.

Collet in U.S. Pat. No. 4,426,842 also heats air supplied to a compression unit wherein the invention relates to a system for heat recovery in which part of the waste heat in the combustion gases after their expansion is returned with recovery means into the combustion air flow.

Mangan et al., La Haye and Rice do not refer to any specific fuels used in their combustion units. Collet uses a fuel-like natural gas or fluid fuel in his combustion unit.

SUMMARY OF THE INVENTION

The present invention relates to a process by which gas turbine generator systems can use moist, low BTU fuel gases with little or no bleed from the outlet of the compression unit, and without the associated energy loss and/or expense. The process, which maintains the gas turbine power output, but decreases the quantity of fuel and air flow required, involves heating the inlet air sufficient to increase the absolute temperature of the inlet air to the compression unit, reducing its density, and thus decreasing its mass flow, since the compression unit has an essentially constant volume flow at its inlet. We have found that an increase in the absolute temperature of the inlet air to the compression unit, when using moist, low BTU fuel gases in the combustion unit, will decrease the mass of air through the compression unit and thus will significantly reduce or even eliminate the necessity of air bleed from the system. Thus, by increasing the absolute temperature of the inlet air by about 5 to about 30 percent, generally by about 8 to about 20 percent, above ambient temperature, or above the air inlet temperature generally used, the mass of air flow will be reduced by almost the same percentage amount and the amount of air bleed required will be substantially reduced or will not be necessary.

Varying the air inlet temperature does not affect the work of compression, because work for a given pressure ratio is directly proportional to the product of the absolute temperature and the air flow, which is inversely proportional to the absolute temperature. If the temperature and pressure to the expansion unit are maintained constant, the constancy of flow results in a constant power output.

While increasing the inlet temperature has no significant affect on the gas turbine output, it does decrease the quantity of fuel input required. Since an increased inlet air temperature results in an increased temperature at the outlet of the compression unit, less fuel is required to raise the temperature to the design value at the expander inlet. In this way, the gas turbine efficiency, that is, the ratio of power output to fuel input, is enhanced.

DETAILED DESCRIPTION OF THE PREFERRED EMBODIMENTS

Figures 1, 2:
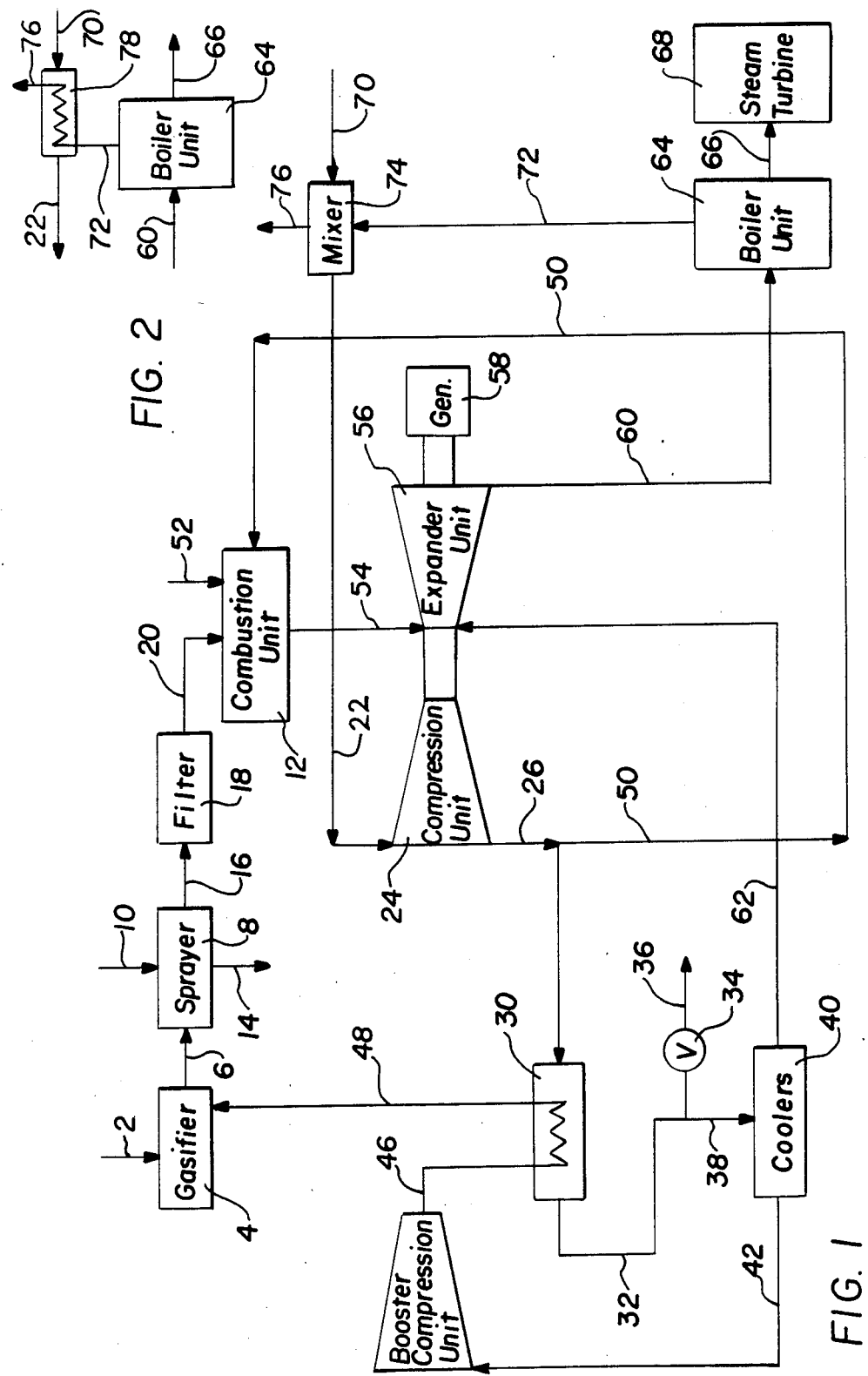
FIG. 1 is a simplified schematic diagram of the operation of a gas turbine generator in accordance with the novel process herein, showing one means for increasing the temperature of the air supplied to the compression unit.
FIG. 2 is a simplified schematic diagram of the process herein, similar to FIG. 1 but showing another means for increasing the temperature of the air supplied to the compression unit.

Referring to FIG. 1. a solid fuel, such as peat or combustible wastes, is introduced by line 2 into gasifier 4 wherein, by any conventional method, for example, by air flow gasification, the solid fuel is converted to a gaseous product predominating in a gaseous fuel having a low BTU value, such as carbon monoxide and hydrogen. By "low BTU value" we mean that the gas so produced will have a heat value within the range of about 80 to about 150 BTU's per standard cubic foot. The gaseous product so produced is passed by line 6 to a sprayer 8 wherein water from line 10 is sprayed therein to reduce the temperature of the gas to a level wherein it can be suitably used in the combustion unit 12. Any unevaporated spray water is removed from the sprayer unit 8 by line 14. The cooled gas is then passed by line 16 to filter 18, wherein substantially all of the particulate matter in the gas can be separated therefrom, and finally by line 20 to combustion unit 12.

Air, heated in accordance with the invention herein, which will be described hereinafter, is passed by line 22 into compression unit 24, wherein it is compressed to an elevated pressure level, as in conventional processes, and is removed therefrom by line 26. A portion of the air in line 26 is passed by line 28 through heat exchanger 30 and exits therefrom by line 32.

We have found, when using low BTU gases herein, it was necessary to bleed from the system, up to about 20 volume percent of the compressed air through valve 34 in exit line 36. This was necessary because the large mass of moist, low BTU gas fuel required in the combustion unit 12 to reach the designed expansion unit inlet temperature resulted in an increased mass flow of air through the expansion unit and an increased unit inlet pressure. In accordance with the practice of this invention, little or no bleed of air through line 36 is required and, therefore, valve 34 can be closed, or avoided, or can be opened as desired, to obtain a very small amount of bleeding.

In accordance with the novel process herein, all, or substantially all, of the compressed air in line 32 is passed by line 38 to a series of coolers 40 wherein the temprature thereof is reduced, using any suitable indirect means. A portion of the cooled air is passed by line 42 to a booster compression unit 44. The remaining portion of the cooled air is returned through line 62 to the gas turbine expander where it is used to maintain expander components at operating temperatures below that of the incoming combustion product gases. The compressed air from booster compressor unit 44 is then passed by line 46 through heat exchanger 30, wherein it is heated by indirect exchange with the air from line 28, and then passed into gasifier 4 by line 48 for gasification of the solid fuel in line 2.

The air in line 26 that was not removed therefrom by line 28 is passed by line 50 to combustion unit 12. If desired, some water can also be introduced into combustion unit 12 by line 52 in order to reduce the nitrogen oxide content of the combustion gases obtained therein. The combustion gases so obtained are passed by line 54 to expander unit 56, which is operatively coupled to compression unit 24 and to a generator 58.

The expanded combustion gases from expansion unit 56 are removed therefrom by line 60 and passed to a boiler unit 64 to produce steam that is sent by line 66 to a steam turbine 68. p In accordance with the invention defined herein, in order to reduce or substantially eliminate bleeding of compressed air from line 36, the air entering the system in line 70 is heated to increase its absolute temperature by about 5 to about 30 percent, generally by about 8 to about 20 percent, prior to passing the same to line 22 and through compression unit 24. This is done using any suitable means, but in accordance with the preferred embodiments herein, the air in line 70 is heated, directly or indirectly, with the exhaust gases from the system. In the embodiment of FIG. 1, this is done by passing the hot exhaust gases in line 72 in direct contact with the entering air from line 70 in mixer 74. By means not shown, a portion of the exhaust gas is mixed with the entering air to obtain a gaseous mixture having the desired temperature for the air entering compression unit 24 and containing sufficient air for subsequent use in combustion unit 12. The heated mixture is sent to compressor unit 24, while the remainder of the exhaust gas is removed from the system by line 76. In the embodiment in FIG. 2, the exhaust gas is passed through heat exchanger 78 in indirect contact with the entering air in line 70 to heat the same to the desired temperature level.

The data in Table I below show the unexpected advantages obtained by increasing the absolute temperature of the air entering the gas turbine generating system herein. The fuel used to obtain the low BTU gas (120 BTUs per cubic foot) was peat having a lower heat value of 6000 BTUs per pound, producing a fuel gas having a heat value of 1817 BTUs per pound. Operation is carried out, in one instance, by not preheating the ambient air and air bleeding is used, while in the other, the air is preheated by admixture with hot expanded exhaust gases, with essentially no air bleeding. In the data below, pressure, temperature, heat value of the gaseous mixture and weight thereof are given with reference to the corresponding lines in FIG. 1.

TABLE I

| | No Air Preheat | | | | Air Preheated | | | |
|---|---|---|---|---|---|---|---|---|
| Line | Pressure, PSIA | T, °F. | BTU Per Pound | Pounds Per Hour | Pressure PSIA | T, °F. | BTU Per Pound | Pounds Per Hour |
| 22 | 14.696 | 59° | 28.486 | 1,240,600 | — | 167.78 | 54.592 | 1,025,600 |
| 26 | 144.46 | 630.52 | 168.11 | 1,240,600 | 144.42 | 845.24 | 222.77 | 1,025,600 |
| 50 | 144.46 | 630.52 | 168.09 | 797,480 | 144.42 | 845.24 | 222.77 | 834,950 |
| 28 | 144.46 | 630.52 | 168.09 | 443,080 | 144.42 | 845.24 | 222.77 | 190,640 |
| 32 | 143.38 | 566.98 | 152.20 | 443,080 | 143.33 | 722.29 | 191.30 | 190,640 |
| 38 | 143.38 | 566.98 | 152.20 | 226,610 | 143.33 | 722.29 | 191.30 | 190,570 |
| 36 | 143.38 | 566.98 | 152.20 | 216,470 | 143.33 | 722.29 | 191.30 | 77.811 |
| 62 | 140.51 | 400.00 | 110.91 | 101,730 | 140.47 | 400.00 | 110.91 | 84,099 |
| 42 | 137.70 | 150.00 | 50.316 | 124,800 | 137.66 | — | — | 106,470 |
| 46 | 290.22 | 322.19 | 91.949 | 124,880 | — | 322.27 | 91.969 | 106,470 |

TABLE I-continued

| | No Air Preheat | | | | Air Preheated | | | |
|---|---|---|---|---|---|---|---|---|
| Line | Pressure, PSIA | T, °F. | BTU Per Pound | Pounds Per Hour | Pressure PSIA | T, °F. | BTU Per Pound | Pounds Per Hour |
| 48 | 288.04 | 540.00 | 145.46 | 124,880 | — | — | — | 106,470 |
| 6 | 265.00 | 1650.00 | 574.85 | 210,950 | — | — | — | 179,970 |
| 20 | 262.35 | 900.00 | 327.72 | 250,790 | — | — | — | 213,960 |
| 54 | 138.68 | 1804.70 | 528.73 | 1,114,500 | 138.64 | 1809.40 | 524.50 | 1,115,500 |
| 60 | 15.200 | 936.71 | 266.36 | 1,153,000 | — | 939.23 | 264.97 | 1,141,400 |
| 72 | 14.861 | 549.72 | 158.91 | 1,153,000 | — | 547.16 | 156.96 | 1,141,400 |

The data obtained above are most unusual. In one case wherein air is not preheated and is introduced into the compression unit at 59° F., about 17.5 percent of the air is bled from the system in order to prevent surges in the compression unit. This is determined by comparing the amount of air removed from the system in line 36 (216,470 pounds per hour) with the amount of air introduced into the system through line 22 (1,240,600 pounds per hour).

In the second case however, the temperature of the incoming air is raised from 59° F. (518.69° Renkine) to 167.78° F. (627.47° Rankine), representing an absolute temperature increase of almost 21%. When this is done, no appreciable amount of air is bled from the system by line 36 (77.811 pounds per hour). The amount of air entering the system is reduced from 1,240,600 pounds per hour to 1,025,600 pounds per hour, a reduction of slightly more than 17%. Additionally, the amount of gaseous fuel entering the system in line 6 is reduced from 210,950 pounds per hour to 179,970 pounds per hour, reduction of almost 15 percent. And yet, surprisingly, the pressures, temperatures and the flow rates of the combustion gases leaving combustion unit 12 in line 54 are substantially the same as in the case wherein air is not preheated.

Thus, the efficiency of a gas turbine generator system using low BTU fuels is increased by the expedient of raising the absolute temperature of the air entering the system. Less air and fuel are required, power output is maintained and bleeding of air from the system to prevent surges in the compression unit is not required.

What is claimed is:

1. In a process for operating a gas turbine system containing a compression unit, a combustion unit and an expansion unit to operate a generator, and wherein a portion of the air from said compression unit is bled from the system so as to prevent surges in said compression unit by limiting the flow of combustion gases to said expansion unit, the improvement comprising using a gaseous fuel having a low BTU value in said combustion unit with the discharge of hot combustion exhaust gases therefrom, heating the air charged to said compression unit and reducing the volume of air from said compression unit that is bled from the system and thereby increasing the efficiency of the gas turbine system.

2. The process of claim 1 wherein the air charged to said compression unit is heated using the hot expanded combustion gases from said expansion unit.

3. The process of claim 2 wherein said heating is effected by indirect heat exchange of said hot expanded combustion gases from said expansion unit with the air charged to said compression unit.

4. The process of claim 2 wherein said heating is effected by direct heat exchange of a portion of said hot expanded combustion gases with the air charged to said compression unit.

5. The process of claim 1 wherein the air charged to said compression unit is heated to increase the absolute temperature thereof by about 5 to about 30 percent above ambient temperature.

6. The process of claim 5 wherein the air charged to said compression unit is heated to increase the absolute temperature thereof by about 8 to about 20 percent above ambient temperature.

7. The process of claim 2 wherein said hot expansion gases from said expansion unit are first passed through a boiler prior to using the same to heat the air charged to the compression unit.

8. In a process for operating a gas turbine system containing a compression unit, a combustion unit and an expansion unit to operate a generator and wherein a portion of the air from said compression unit is bled from the system so as to prevent surges in said compression unit by limiting the flow of combustion gases to said expansion unit, the improvement comprising using a gaseous fuel having a low BTU value in said combustion unit with the discharge of hot combustion exhaust gases therefrom, heating the air charged to said compression unit, reducing the volume of air from said compression unit that is bled from the system and thereby increasing the efficiency of the gas turbine system, passing a first portion of the air from said compression unit to said combustion unit and a second portion of said compressed air is passed to a gasifier, introducing a solid fuel into said gasifier, producing a gaseous fuel having a low BTU value in said gasifier, and passing said gaseous fuel to said combustion unit to react with said first portion of air to produce said hot exhaust gases.

9. The process of claim 8 wherein said fuel is peat.

10. The process of claim 8 wherein said second portion of said air is passed through a booster compression unit prior to its entry into said gasifier.

11. In a process for operating a gas turbine system containing a compression unit, a combustion unit, and an expansion unit to operate a generator, and wherein a portion of the air from said compression unit is bled from the system so as to prevent surges in said compression unit by limiting the flow of combustion gases to said expansion unit, the improvement comprising using a gaseous fuel having a low BTU value produced in a gasifier with the discharge of hot exhaust gases therefrom, heating the air charged to said compression unit to increase the absolute temperature thereof by about 5 to about 30 percent above ambient temperature, using the expanded hot combustion gases from said expansion unit so as to reduce the volume of air from said compression unit that is bled from the system and thereby increasing the efficiency of the gas turbine system, passing said hot combustion gases through a boiler prior to using the same for said heating, passing a first portion of the air from the compression unit to said combustion unit and passing a second portion of said compressed air through a booster compression unit and then to said gasifier.

12. The process of claim 11 wherein said air charged to said expansion unit is heated to increase the absolute temperature thereof by about 8 to about 20 percent above ambient temperature.

13. The process of claim 11 wherein the air charged to said compression unit is heated by indirect heat exchange with the hot expanded combustion gases from said expansion unit.

14. The process of claim 11 wherein the air charged to said compression unit is heated by direct heat exchange with the hot expanded combustion gases from said expansion unit.

* * * * *